United States Patent [19]

Tung

[11] Patent Number: 4,753,460
[45] Date of Patent: Jun. 28, 1988

[54] TUBULAR CONNECTION HAVING TWO THREAD SETS WITH MULTIPLE INTERENGAGING CHARACTERISTICS

[75] Inventor: Lawrence Y. Tung, Houston, Tex.

[73] Assignee: The Hydril Company, Houston, Tex.

[21] Appl. No.: 727,860

[22] Filed: Apr. 26, 1985

[51] Int. Cl.$^4$ ............................................. F16L 25/00
[52] U.S. Cl. .................................... 285/334; 285/351; 285/355; 411/424
[58] Field of Search ............... 285/333, 334, 355, 390, 285/334.4; 403/343; 411/411, 412, 424

[56] References Cited

U.S. PATENT DOCUMENTS

| | | | |
|---|---|---|---|
| 2,239,942 | 4/1941 | Stone et al. | 285/334 X |
| 3,606,403 | 9/1971 | Medney | 285/334 A |
| 4,161,332 | 7/1979 | Blose | 285/334 |
| 4,398,756 | 8/1983 | Duret et al. | 285/334 |
| 4,521,042 | 6/1985 | Blackburn et al. | 285/334 |
| 4,537,429 | 8/1985 | Landriault | 285/334 |
| 4,549,754 | 10/1985 | Saunders | 285/334 A X |

FOREIGN PATENT DOCUMENTS

| | | | |
|---|---|---|---|
| 48408 | 8/1984 | European Pat. Off. | 285/334 |
| 396093 | 7/1933 | United Kingdom | 411/424 |

Primary Examiner—Dave W. Arola
Attorney, Agent, or Firm—Vaden, Eickenroht, Thompson & Boulware

[57] ABSTRACT

A tubular connection is disclosed having a small diameter thread set and a large diameter thread set, the small thread set having a lesser number of threads than the large set. A primary torque shoulder is located between the threads sets and a secondary torque shoulder is located behind the large thread set. In the preferred embodiment, the initial partial thread on the pin of both sets and the last partial thread of the small set on the box has a cylindrical root contour, whereas the remainder of the threads are tapered. The longitudinal taper angle of the pin thread sets are dissimilar to the box thread sets, there being a maximum separation of the sets near the center of the connection. Such dissimilar tapering tends to equalize the stress applied to the threads under tension loading. At the center, a seal is provided with hooked threads on either side thereof. The arrangement also provides a torque shoulder at either end of the large thread set. The arrangement provides in a tapered connection having two thread sets of difference diameters, two torque shoulders and two metal-to-metal seal areas.

51 Claims, 5 Drawing Sheets

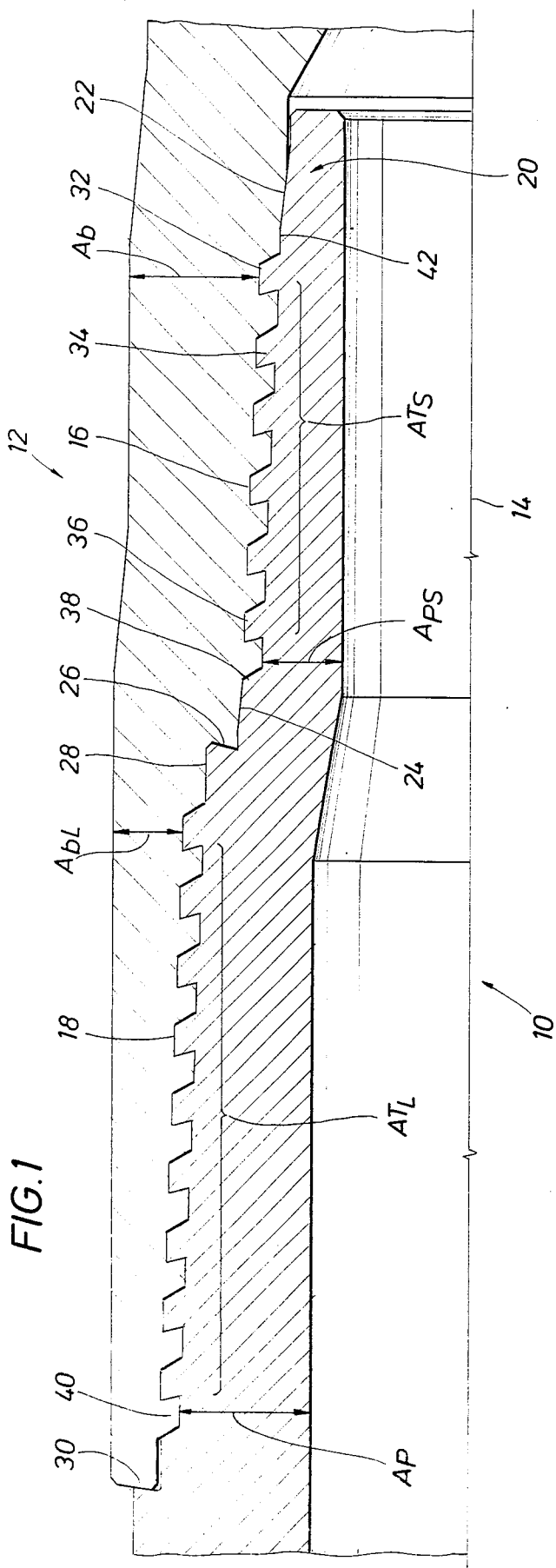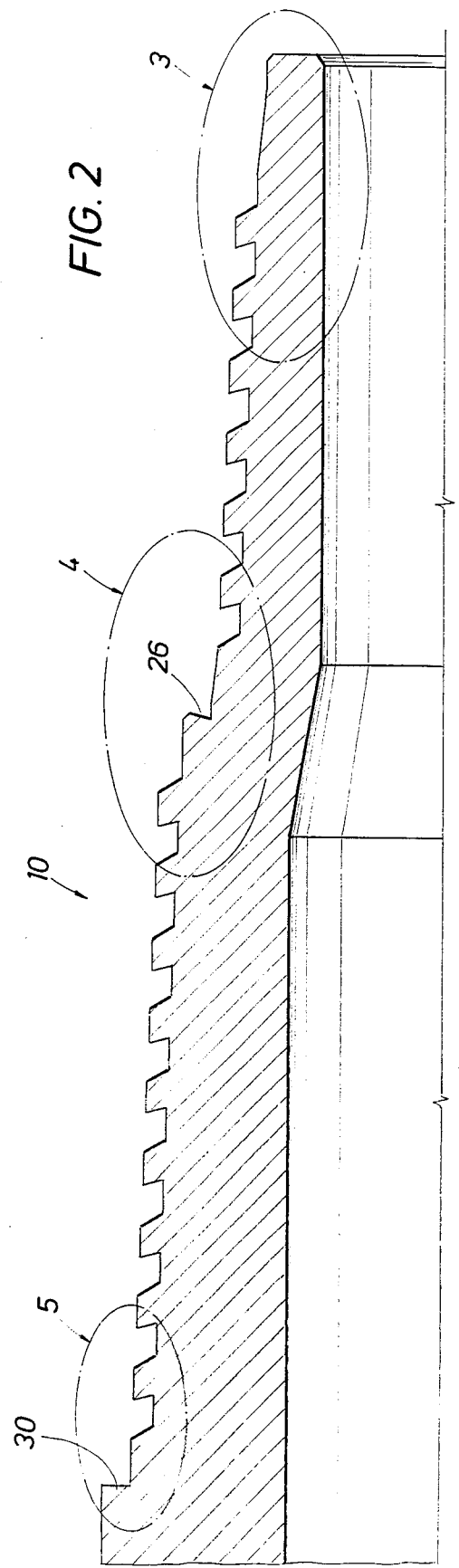

TUBULAR CONNECTION HAVING TWO THREAD SETS WITH MULTIPLE INTERENGAGING CHARACTERISTICS

BACKGROUND OF THE INVENTION

1. Field of the Invention

This invention pertains to thread configurations employed in tubular products such as oil well tubing, casing, line pipe and drill pipe, all of which are referred to as "pipe" for convenience.

2. Description of the Prior Art

Generally speaking, a pipe connection comprises a pin member ("pin") and a box member ("box"). In some cases the box is included in a coupling wherein each of its two box ends provides for joining two pipe joints pin-end-to-pin-end. However, a pipe connection usually joins the pin of a first joint to the box of an adjoining second joint. In the discussion herein, reference will be made to such a usual connection, as a matter of convenience, although it will be understood that a "connection" refers to a connection employed a coupling, as well.

Over the years, pipe connections have been developed which fall into a series of definable categories. The American Petroleum Institute (API) has standardized a single step tapered connection which has an interference thread.

Premium pipe thread construction was introduced with the advent of the two-step thread design pioneered and developed by the Hydril Company. The design is generally known in the industry as the Hydril thread, and is described in U.S. Pat. Nos. 2,532,632 and 2,992,019. Fairly recent improvements in two-step thread designs are shown, for example, in U.S. Pat. Nos. 4,161,332 and 4,192,533. The Hydril two-step thread design was the first thread specifically developed for the increasingly difficult environmental factors encountered with deeper wells.

Various modifications of the API standard thread and the Hydril premium thread have been developed over the years to meet the continually changing needs of the petroleum industry.

A two-step thread design indicates that there is a first thread set generally at a first and smaller diameter and a second thread set axially displaced behind the first thread set generally at a second and larger diameter. Considering all types of pipe, pin ends of pipe can either be tapered or non-tapered, and the threads located thereon can also be tapered or non-tapered independently of the pipe. Non-tapered threads are parallel to the pipe axis throughout the thread set. Tapered thread sets are inclined at the angle intersecting the pipe axis. Tapered thread sets may include roots and crests which are parallel to the pipe axis, parallel to the inclined taper or a combination. In a tapered thread set, the diameter of a thread set does not remain constant throughout its length, such as with a cylinder, but gradually becomes larger progressing from the front end of the thread set. That is, in tracking the diameter of a root or a crest, the diameter becomes increasingly larger along a helical path following the thread set.

In addition, thread sets are designed to be free-running (or clearance) or interference fit. In a free-running design, the mated thread sets on a pin and box can be made up without interference, with clearance between the complimentary roots, crests and thread flanks. Interference threads actually engage upon mating and provide resistance during makeup. The API thread is an interference design, whereas the Hydril non-tapered two-step premium thread is free-running.

API interference threads usually rely on the engagement of the mated threads to provide both the torque stop and the primary seal of the connection. Free running threads require both a torque stop (when fully made up) and an independent seal to complete the connection. There are three locations for torque-shoulder action in a two-step thread: at the step between the thread sets; subsequent to or behind the second and larger thread set on the pin; and at the pin nose. The same areas maybe used for fluid seal locations. Hence, there are three possible fluid seal locations.

The present invention is a variation of the Hydril premium thread in that it uses a free-running, two-step thread with torque stops and seals independent of the thread sets. The present invention utilizes enhanced designed combinations to improve tension efficiency, decrease jump out and burst tendencies and improve leak resistance of the connection. This provides a connection with the same pipe body as prior art connections, but having higher tension, burst and pressure ratings.

Therefore, it is a feature of the present invention to provide an improved thread configuration having a two-step thread arrangement with dissimilar thread set lengths to maximize the tension efficiency of the connection made therewith, to maximize the stiffness of the box member and to maximize the mid-seal integrity with respect to internal pressure, while utilizing the pin nose primary seal of known premium connections.

It is another feature of the present invention to provide an improved thread configuration of a two-step thread arrangement having a double torque shoulder to improved break-out torque.

It is another feature of the present invention to provide an improved connection so as to make it relatively insensitive to entrapment of thread lubricants that may tend to block the pressure energy effect on the primary pin nose seal, to provide extra assembly torque while avoiding high compressive loading, to minimize box buckling tendencies and to provide an improved load distribution.

It is still another feature of the present invention to provide an improved onset structure and an improved completion structure to a thread set to maximize the usefulness of the beginning threads and the completion threads.

It is yet another feature of the present invention to provide an improved thread set arrangement in a two-step or two-set thread wherein the angle of taper for the pin member and box member are dissimilar so that the load on the connection is more evenly distributed.

It is still another feature of the present invention to provide an improved thread set arrangement in a two-step thread wherein each thread set includes negative flank threads, there also being a torque shoulder therebetween which torque action is enhanced by the presence of negative flank threads on either side thereof.

It is yet another feature of the present invention to provide an improved arrangement in a tapered thread set having a torque shoulder at either end thereof.

It is still another feature of the present invention to provide an improved two-step thread arrangement wherein there is an optimum inclusion of two seals and two torque shoulders.

SUMMARY OF THE INVENTION

The tapered connection disclosed herein generally comprises a first interengaged thread set of a smaller diameter and a second interengaged thread set of a larger diameter. Each thread set includes thread roots and thread crests that are parallel to the axis in longitudinal cross-section, but are helically tapered. The smaller thread set is forward on the pin member ahead of the larger thread set. In the illustrated preferred embodiment, the forward and smaller thread set has fewer threads than the larger thread set, the relative number of threads in the sets being selectable to optimize the relative cross-sectional dimensions of the pin and the box at their critical stress locations.

The relative length dimensions of the pin and box, particularly in the larger thread set, are also determined so that there is a torque shoulder between the first thread set and the second thread set for carrying more than 50 percent of the torque load. The remaining torque load is carried by the torque shoulder behind the second thread set on the pin. This balanced torque arrangement minimizes buckling pressure on the box.

The initial partial thread and the end partial thread of each thread set are shaped to be more useful and functional than in prior art threads. The initial partial thread root is cylindrical or "straight" with respect to the longitudinal axis with the first full thread root and crest beginning the taper. By "straight" is meant that there is no helical taper at the initial partial threads. The end partial thread crest is again made straight, although the immediate preceding full thread is of the tapered sequence of threads.

The helical taper of the first or smaller thread set of the pin is different from the helical taper of the corresponding first or small thread set of the box. The helical taper of the second or larger thread set of the pin may also be different from the helical taper of the corresponding second or larger thread set of the box. In the preferred embodiment, measuring from the pipe axis, the taper on the pin small thread is smaller than the corresponding box threads, whereas the taper on the pin large threads is larger than the corresponding box threads. This arrangement provides a more even balancing of stress on the respective threads.

Preferably, the threads of both thread sets include negative flank or hooked profiles. In addition to the torque shoulder located between the thread sets there is also a bearing surface that provides a seat at the root of the torque shoulder. A seal may also be preferably provided by a suitable bearing surface located at the root of the second torque shoulder located behind the second thread set.

BRIEF DESCRIPTION OF THE DRAWINGS

So that the manner in which the above-recited features, advantages and objects of the invention, as well as others which will become apparent, are attained and can be understood in detail, more particualr description of the invention briefly summarized above may be had by reference to the embodiments thereof which are illustrated in the appended drawings, which drawings for a part of this specification. It is to be noted, however, that the appended drawings illustrate only preferred embodiments of the invention and are therefore not to be considered limiting of its scope as the invention may admit to other equally effective embodiments.

In the Drawings

FIG. 1 is a longitudinal cross-sectional view of a connection showing a preferred embodiment of the invention.

FIG. 2 is a detailed longitudinal cross-sectional view of the pin member of a preferred embodiment of the connection shown in FIG. 1.

DESCRIPTION OF THE PREFERRED EMBODIMENT

Figure 3:
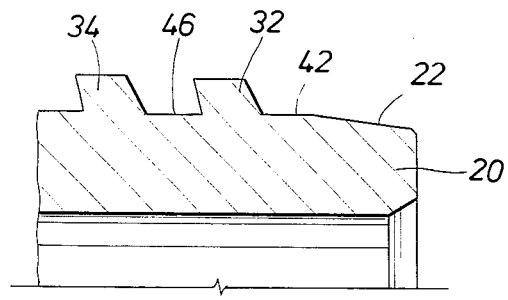
FIG. 3 is an enlarged view of the area designated "3" in FIG. 2.

The following description of a preferred embodiment illustrates how critical cross-sectional areas of a connection can be optimized while simultaneously maximizing load bearing areas. Also, by selecting non-uniform tapers, modifying seal and torque shoulder placement, and combining the positive design criteria of both prior art tapered connections and also prior art non-tapered connections, a flexible connection design is achieved which allows the application to dictate the connection configuration rather than vice versa. That is, using the design criteria described herein, a connection can be designed to meet the most critical application criteria by optimizing the design around these criteria. What follows is a detailed description of one such embodiment.

Now specifically referring to the drawings, and first to FIG. 1, a preferred embodiment of the invention connection is shown in longitudinal cross section. The connection generally comprises a pin 10 and a box 12. Axis 14 of the conection is the axis of both the pin and the box and of the bore opening through the connection. There are two interengaged thread sets. Thread set 16 includes the threads on the forward end of the pin member and thread set 18 includes the threads in the other or larger thread set longitudinally displaced therefrom. For convenience, thread set 16 is referred to as the "small" thread set or step since its diameter and circumference are generally smaller than for thread set or step 18, which for convenience is referred to as the "large" thread set or step.

The portion of pin 10 forward of small thread set 16 is referred to as the pin nose 20. Pin nose 20 is not uniformly tapered, as explained below. Initially, there is a tapered portion 22. The portion of the pin nose behind portion 22 and immediately preceding the initial partial thread is pilot surface 42.

The mid-portion of the connection between the large and small thread sets generally comprises bearing surface 24 and torque shoulder 26. There is also a pilot surface 28 immediately preceding the initial partial thread of large step set 18. Torque shoulder 30 is located behind thread set 18. However, there is no bearing surface preceding torque shoulder 30 as with torque shoulder 26.

The threads of pin 10 are referred to for purpose of relative sequence from right to left as they are shown in FIG. 1. That is, initial partial thread 32 of thread set 16 is followed by first full thread 34. The last full thread of thread set 16 is thread 36, which is followed by last partial thread 38 of the thread set. As shown, the crest of partial thread 38 on the pin blends into bearing or seal surface 24 in a manner more fully explained hereinafter. In many cases, depending on the size of the connection, there is a space or flat area between crest 38 and seal 24. However, as shown here, the connection is fully functional when the crest 38 blends into seal 24.

Also, for convenience of description, the threads of box 12 are referred to in the same right to left order as the threads on the pin. Hence, the first partial thread of the box is that partial thread which is deepest within the box receiving cavity and which mates with partial thread 32 of the pin when the connection is fully made up. The first full thread of the box is the thread next to the initial partial thread of the box just described. It follows then that the last full thread of the large thread set of the box is thread 40, which is the first thread within the opening or cavity of the box.

The thread design of the preferred embodiment which is illustrated includes a thread profile which generally has a negative or hooked load flank. Although there are numerous advantages of such a thread profile, as explained in U.S. Pat. Nos. 4,161,332 and 4,192,533 among others, the advantages of the thread arrangements described herein are also achieved for thread profiles which are positive unless otherwise specifically stated as an advantage attributable to the presence of negative load flanks.

Moreover, the design of the relative number of threads to be discussed is with respect to tapered thread sets wherein the threads progress through increasingly larger diameters away from the nose of the pin. However, the design formulas are also applicable to non-tapered threads, as well.

Now referring to the interrelated locations of the pin and box of the connection, area $A_b$ is the normal or cross-sectional area (i.e., the area of a slice taken at a right angle to axis 14) of the box at the root of the first thread of the box small step. Area $A_p$ is the normal or cross-sectional area of the pin at the root of the last thread of the pin large step. Area $A_{bL}$ is the normal or cross-sectional area of the box at the root of the first thread of the box large step. Area $A_{ps}$ is the normal or cross-sectional area of the pin at the root of the last thread of the pin small step. Area $AT_L$ is the load area of the spiral which defines the flanks of the threads of the large step. Area $AT_S$ is the total load area of the spiral which defines the flanks of the threads of the small step.

By utilizing partial initial and final threads on each step, it can be seen that optimum design criteria are achieved where areas $A_b$, $A_{bL}$, $A_p$, and $A_{ps}$ are maximized while areas $AT_L$ and $AT_S$ are also maximized. This maintains the critical cross-sectional areas of the pin and box at maximum while allowing the greatest possible thread area $AT_L$ and $AT_S$ for carrying the connection load.

Although the advantages of the thread arrangements are achieved when thread area $AT_s$ is made smaller than thread area $AT_L$ alone, this connection geometry is optimized for a connection where the pin cross-sectional area $A_p$ is the critical section area when the following are used as design guidelines:

$$A_p \leq AT_L + A_{ps}; \tag{1}$$

$$A_p \leq AT_s + A_{bL}; \tag{2}$$

$$A_p \leq AT_L + AT_S; \tag{3}$$

$$A_p \leq A_{bL} + A_{ps}; \text{ and} \tag{4}$$

$$A_p \leq A_b. \tag{5}$$

When the box cross-sectional area $A_b$ is the critical section area, the following relationships are used as design guidelines:

$$A_b \leq AT_L + A_{ps}; \tag{1}$$

$$A_b \leq AT_S + A_{bL}; \tag{2}$$

$$A_b \leq AT_L + AT_S; \tag{3}$$

$$A_b \leq A_{bL} + A_{ps}; \text{ and} \tag{4}$$

$$A_b \leq A_p. \tag{5}$$

The critical section is defined by application, material and environmental conditions. Normally, the box area $A_b$ is the reference dimension or starting design point for establishing the relative values for the other dimensions defined above. The outside dimension of the connection is determined by the market conditions, which also determines the OD and ID condition of the pin and the box.

It should be apparent that the basic thread diameter of the large thread set is larger than the basic thread diameter of the small thread set. Hence, for the same normal cross-sectional dimension as viewed in FIG. 1, area $A_{bL}$ is greater than area $A_{ps}$. In order to establish area $A_{bL}$ at a desirably relatively large area to area $A_{ps}$, it can be necessary to establish the number of threads participating in area $AT_s$ to be less than the number of threads participating in area $AT_L$. The number of threads to optimize the areas of the formulas set forth above can result in the number of threads of the small thread set being larger or equal in number to the number of threads of the large thread set. Normally, however, the number of threads of the small set will be approximately one-sixth to one-half fewer than the number of threads of the large set. Generally, the number will be within the ratio range of threads from 1/6 to 9/10.

As will be further apparent, the matching for structural stiffness of the cross-sectional areas and the load flank areas of the pin and box can be fine tuned by appropriately dimensioning the initial partial threads of the thread sets and/or by the tapering of the roots and/or crests of at least some of the threads in one or both of the thread sets in the manner hereinafter discussed.

Using these design guidelines, as can be seen from FIG. 1, the outward radial stiffness of the box at bearing surface 24 is at least as great as the outward radial stiffness of the pin at this point. This is desiable because the pin is designed to be forced toward the box during loading in order to properly energize the seals. In order to accomplish this, the pin stiffness and the box stiffness are taken into account during application of the design formulas.

A detail of a preferred embodiment of a pin is shown in FIG. 2. As previously mentioned, there are preferably two torque shoulders, shoulder 26, at a position between the thread sets, and shoulder 30, behind the second or large thread set. The illustrated design uses the intermediate shoulder 26 as the primary torque shoulder and retains shoulder 30 as a secondary torque shoulder. By properly dimensioning the relative lengths of the box and pin, particularly with respect to the length of these members related to the large thread set, torque shoulder 26 can be designed to carry the rated load. Shoulder 30 provides a back-up shoulder to carry overloads in the case of over torquing or when the compression load exceeds the connection ratios. With such a design, the back-up torque shoulder reduces the potential for jump out even during overloading conditions. Also, such torquing is compatible with equalizing flank loading discussed below. This also enhanced anti-buckling tendencies which, in turn, improves sealing capability. It is recognized that by properly dimensioning the relative proportional lengths of the box and pin the load can be distributed between torque shoulders 26 and 30 in any desired ratio.

Figure 4:
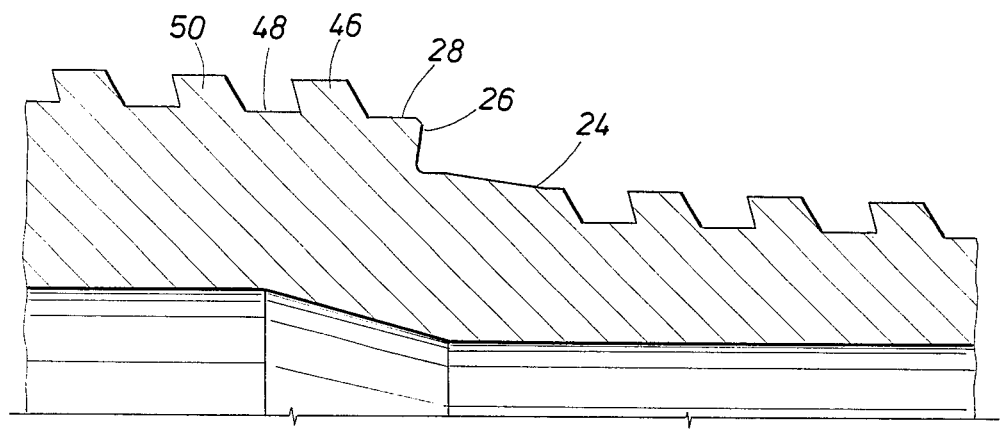
FIG. 4 is an enlarged view of the area designated "4" in FIG. 2.

Both torque shoulders are either at a right angle, or preferably, at an oblique angle to axis 14 of the connection. Referring to FIG. 4, it may be seen that a preferred angle for shoulder 26 is 80°, although a range of from 60°–90° is acceptable.

Figure 12:
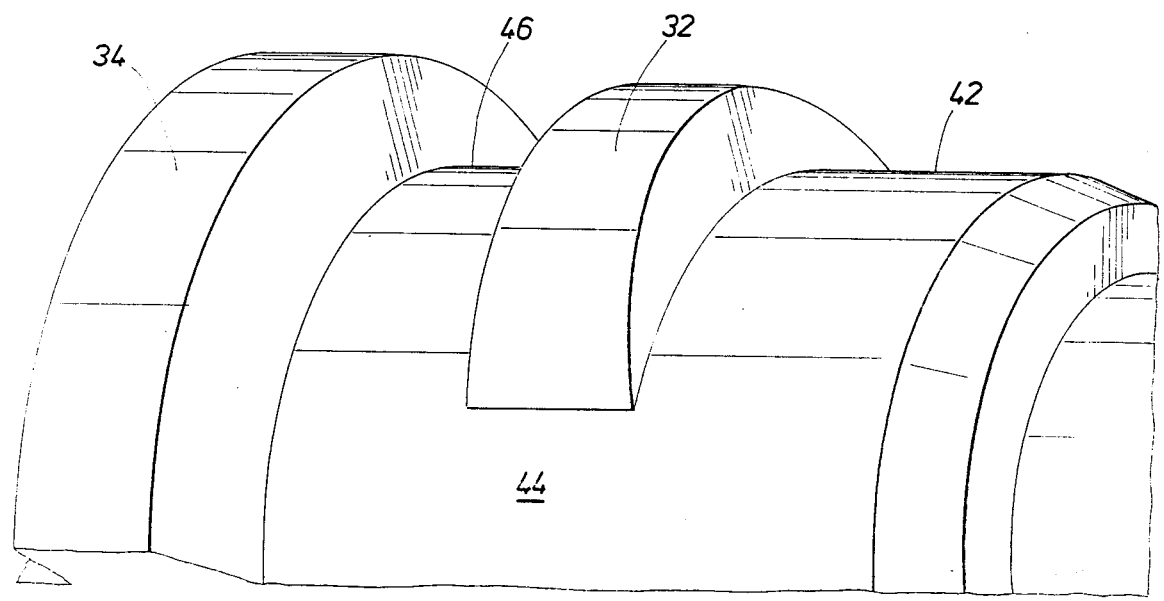
FIG. 12 is an oblique view of a partial initial thread of a thread set employed in a preferred embodiment of the invention.

Now referring to pin nose 20, as best can be seen in FIGS. 3 and 12, the surface includes a tapered portion 22 near the front end that defines the primary seal surface on the pin. Located behind tapered portion 22 is a straight section or pilot area 42 which is advantageously at the same diameter as the thread root at the start of initial partial thread 32. Moreover, as shown in FIG. 12, the diameter of pilot area 42 and of root area 44 preceding the initial thread is the same as the diameter of root 46 between the crest of initial partial thread 32 and that of first full thread 34, i.e. there is no helical taper. The root dimensions just described are cylindrical with no dimensional enlargement of the root diameter along the spiral track of the thread. The taper begins at the root area between the first full thread 34 and the next subsequent thread.

The configuration just described is in contrast with tapered threads in general wherein the helical taper to the root diameter begins with the pilot area. Hence, in the standard thread arrangement, there is a progressively larger diameter at root areas 42, 44 and 46 in FIG. 12. The invention achieves approximately 30 percent more usable thread contact for the same thread rotation than the standard thread arrangement.

Referring to FIG. 4, in addition to the dimensional configuration just described existing at the onset of small thread set 16, the same dimensional configuration exists at the onset of large thread set 18. That is, pilot area 28 has the same root dimension up to and including the onset of initial partial thread 46 and beyond to root area 48, which is between initial partial thread 46 and first full thread 50 of large thread set 18.

Figure 6:
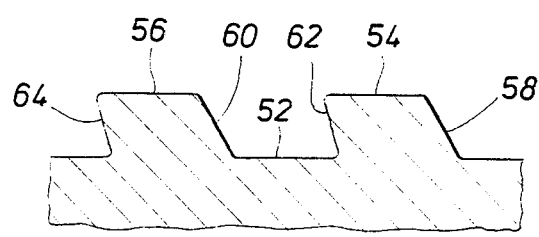
FIG. 6 is an enlarged thread cross-sectional view of the pin member shown in FIG. 2.

FIG. 6 illustrates the profiles of the threads of each thread not including the initial and last partial threads. Both the roots and the crests are helically tapered, as shown. However, the longitudinal cross-sectional dimension of the roots, illustrated as a typical root 52, and of the crests, illustrated as typical crests 54 and 56, are parallel to the axis of the connection. In the illustrated embodiment, stab flanks 58 and 60 are at a greater angle than load flanks 62 and 64, which is normal for a hooked thread configuration. The variation in angles aid in stabbing and assembly.

Figure 7:
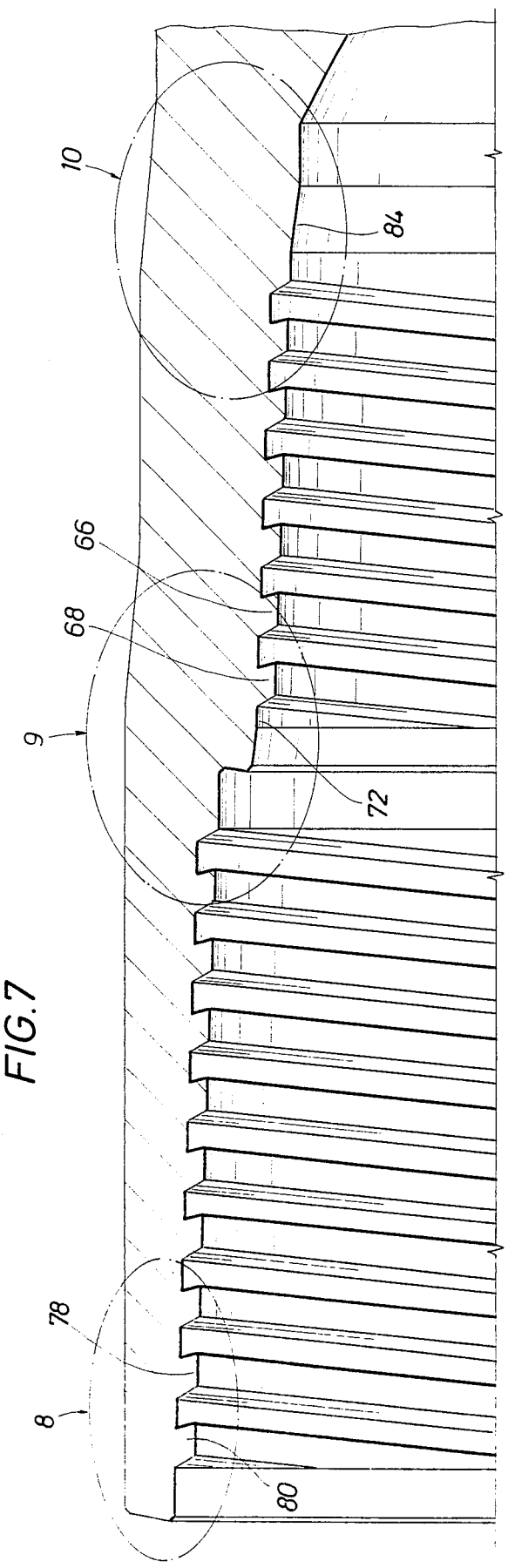
FIG. 7 is a detailed longitudinal cross-sectional view of the box member of a preferred embodiment of the connection shown in FIG. 1.
Figure 9:
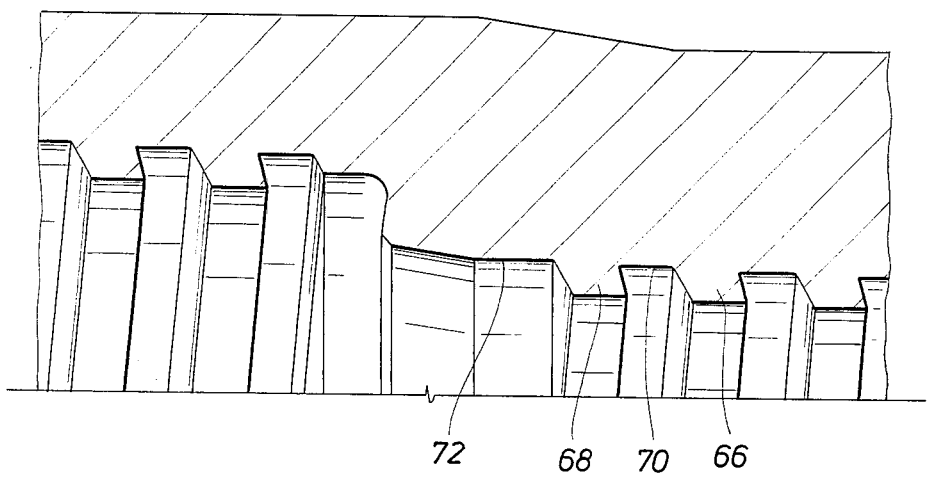
FIG. 9 is an enlarged view of the area designated as "9" in FIG. 7.

There is a similar relationship at the end of thread set 16 to that of the initial partial thread that can best be appreciated by reference to the box member as illustrated in FIGS. 7 and 9.

The last full thread of the small thread set on the box is thread 66. This thread is followed by partial thread set 68, which is the last thread of the set. Thus, the crest height of thread 68 is less than the crest height of thread 66. The diameter of root 70 between the crests and the diameter of pilot area 72 following crest 68 is the same with no helical taper of the root following the onset of root area 70.

Figure 5:
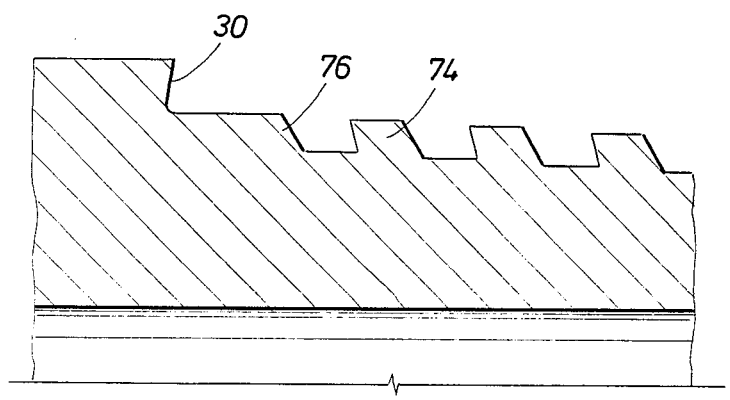
FIG. 5 is an enlarged view of the area designated "5" in FIG. 2.
Figure 8:
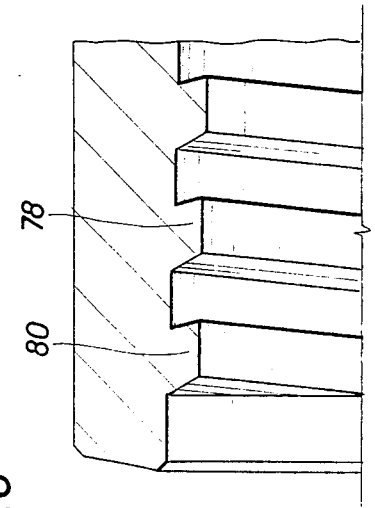
FIG. 8 is an enlarged view of the area designated as "8" in FIG. 7.

Now referring to FIGS. 1, 5 and 8 for illustration of the thread area at the last portion of the large thread set, it will be seen from FIG. 1 that there is no radial contact between the areas of the pin and the box in advance of torque shoulder 30. This is accomplished by the lack of helical taper of the crest dimension between last full thread 74 of the pin and partial thread 76, although the root dimension tapers to the end. This is in contrast with last two threads 78 and 80 of the large thread set on the box. Note that both the crest diameter and the root diameter of these threads are helically tapered to their respective termination areas, thereby accounting for the radial separation between their respective pilot areas. In the illustrated embodiment this aids in stabbing and assembly. Radial contact may be provided in those instance where a seal is desired at this point.

Reference is now made to FIGS. 4 and 9. FIG. 4 shows tapered area 24 on the pin following the last thread of the small thread set which merges with the tapered portion of area 72 on the box. This creates a metal-to-metal seal in front of torque shoulder 26 as the connection is made up.

Figure 10:
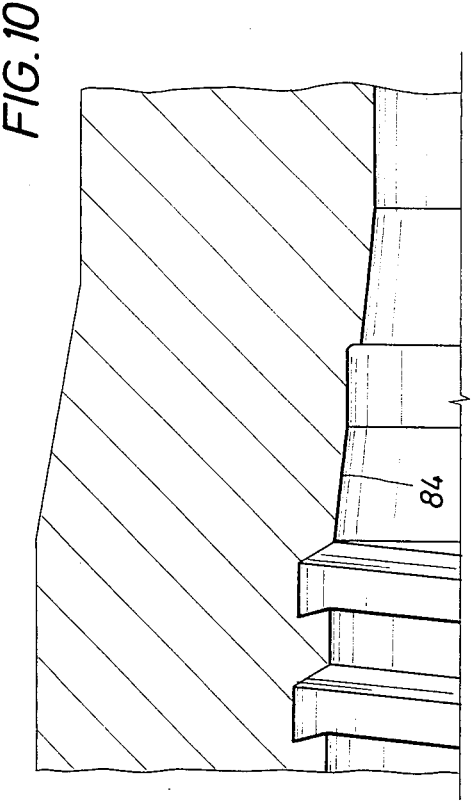
FIG. 10 is an enlarged view of the area designated as "10" in FIG. 7.

In similar fashion, FIG. 10 shows tapered area 84 on the box ahead of the first thread of the small thread set which merges with the tapered portion 22 on the pin discussed above. This also creates a metal-to-metal seal in front of the small thread set. Sealing in this manner effects a desirable double seal at the pin nose and the mid portion of the connection. Clearance at torque shoulder 30 (FIG. 1) precludes sealing at this location and, hence, further reduces bursting and jump-out tendencies of the connection.

Figure 11:
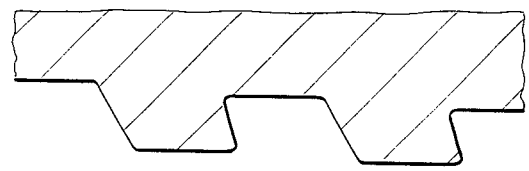
FIG. 11 is an enlarged, small-step or large-step thread cross-sectional view of the box member shown in FIG. 7.

FIG. 11 illustrates the profiles of the large step thread and small step thread of the box member except for those partial threads previously discussed.

Figure 13:
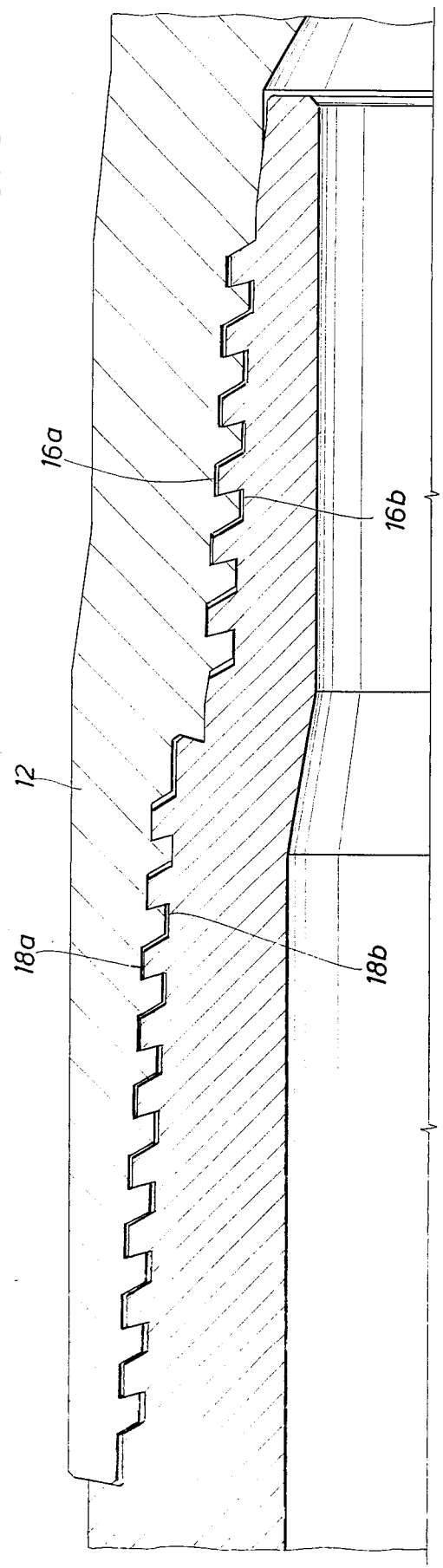
FIG. 13 is a longitudinal cross-section view of the connection shown in FIG. 1, exaggerating the lateral tapers for illustrative purposes.

Now referring to FIG. 13, the relative taper of the pin and box of FIG. 1 shown in longitudinal cross-sections is illustrated. In the drawing, thread set 16a identifies the box small thread set, thread set 16b identifies the pin small thread set, thread set 18a identifies the box large thread set and thread set 18b identifies the pin large thread set. In the tapered connections of the prior art, each of the pin thread sets correspond in longitudinal taper with the respective thread sets of the box. That is, the pin small thread set would have the same taper as the box small thread set. The pin large thread set would have the same taper as the box large thread set. Moreover, the taper of the small thread sets and the taper of the large thread sets would be the same.

In the thread set arrangement shown herein, with all angles measured from the pipe axis, the longitudinal thread set taper profile of the pin small thread set 16b and the pin large thread set 18b are preferably the same. However, the taper angles of the box thread sets are such so as to provide pin-to-box radial clearance in the mid section of the connection with the respective thread sets converging forward and rearward therefrom. Moreover, the other dimensions are such that the threads of thread sets 16b and 16a are closely mated with respect to their load flanks at the end of these thread sets progressing to an even closer and closer condition as the tapers diverse at the start of these thread sets.

An example of the preferred embodiment of the invention includes a pin with thread sets having a taper of 0.090" per longitudinal inch and a box with a taper on the small thread set of 0.088" per longitudinal inch and taper on the large thread set of 0.090" per longitudinal inch. The taper on the box large thread set could be slightly larger than the taper on the corresponding pin set.

With dissimilar tapers of the sort described, it has been discovered that the stress on the thread sets under load are more evenly distributed from thread to thread than when the taper angle of the thread sets on the pin member and the box member are exactly matched.

Returning now to FIG. 1, attention is now brought to the conventional roles of the sealing surfaces and of the torque surfaces. The internal primary seal is at a surface 22 and the secondary internal seal is at surface 24. By "primary" and "secondary" is meant the seal that protects against pressure leaks from occurring from the "internal" direction. Fluid under pressure from within will be sealed first at surface 22, but should there be any leakage at this point, the secondary or back-up seal 24 will prevent fluid from escaping. Seal 24 is the "primary" seal, however, for the external direction. Since there is no seal provided in the vicinity of shoulder 30, external pressurized fluid will be sealed primarily at seal 24. In the event of leakage there, seal 22 provides a secondary external sea.

Attention is now brought to the center section and particularly to bearing surface 24. On either side of this surface in the embodiment shown are negative flank load threads, sometimes referred to as hooked threads. such threads have the quality of reversing the radial stresses on the box member and pin member that are normally attendant to positive load flank threads. That is, a positive load flank thread under axial tension load will tend to expand the box member. However, as a connection including negative load flank threads is tightened, the box member is pulled radially inward. The opposite radial pressures to that applied to the box member are applied to the pin member. With the seal located at bearing surface 24 between the hooked threads, the seal tends to tighten under pressure, rather than separating, thereby making a better seal than in the prior art.

Figure 15:
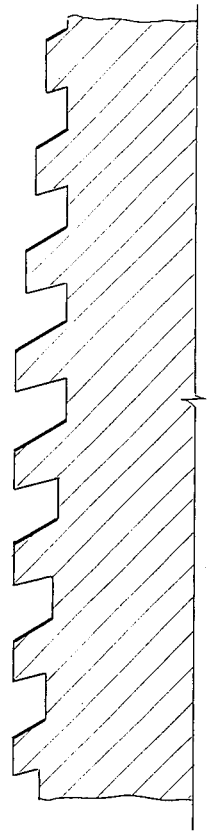
FIG. 15 is a schematic of a longitudinal cross-sectional view of another alternate thread configuration in accordance with the present invention.
Figure 14:
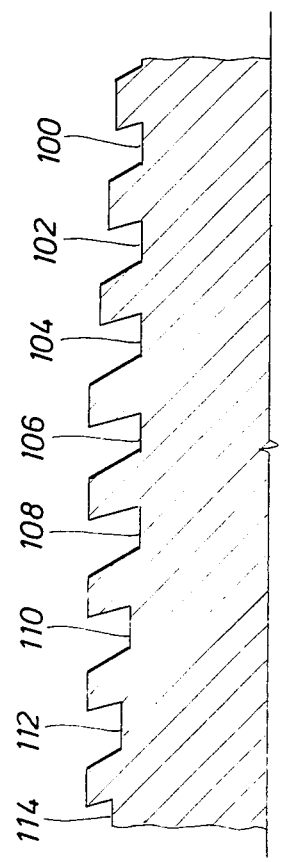
FIG. 14 is a schematic of a longitudinal cross-sectional view of an alternate thread configuration in accordance with the present invention.

Now referring to FIGS. 14 and 15, alternative structures of pin threads in accordance with the present invention are illustrated. These thread sets are extensions of the concept illustrated in FIG. 12. In FIG. 14, roots 100, 102, 104 and 106 of the first several threads do not include a helical taper, whereas the crests of the threads do. Near the end of the thread set, roots 108, 110, 112 and 114 are helically tapered, while the crests are not. in the mid range of the thread set, both the roots and crests are "straight" or non-tapered.

FIG. 15 illustrates a thread set with straight roots and tapered crests in the front portion blending into a configuration with tapered roots and straight crests, there being no intervening threads of straight roots and crests.

The wall thickness dimensions for the thread sets of FIGS. 14 and 15 compare favorably with that previously described for FIG. 12; however, the thread load flanks area is greater for the embodiments of FIGS. 14 and 15. The larger depth of threads in the middle of these thread sets virtually eliminate the problem of jumpout while still maintaining the same tensile efficiency of pipe sections than with the FIG. 12 thread configuration.

While particular embodiments of the invention have been shown and described, with numerous variations suggested, it will be understood that the invention is not limited thereto, since many modifications may be made and will become apparent to those skilled in the art.

What is claimed is:

1. A tubular connection including a threaded pin member interengaging with a threaded box member, said connection having first and second interengaged thread set of different sized diameters, comprising
said first interengaged thread set including a circumferentially smaller pin thread set on the forward end of the pin member,
said second interenegaged thread set axially displaced therefrom including a circumferentially larger pin thread set on the pin member, said first thread set being optimized to equal the loads between said first and second thread sets by having a fewer number of threads than said second thread set to provide a smaller thread area than said second thread set.

2. A tubular connection in accordance with claim 1, wherein said first thread set has approximately one-third fewer threads than said second set.

3. A tubular connection in accordance with claim 1, wherein the ratio of the number of threads in said first thread set compared with the number of threads in said second thread set is within the range of 1/6 to 9/10.

4. A tubular connection in accordance with claim 1, wherein said first thread set is at least equal in number to one-half the number of threads on the second thread set.

5. A tubular connection in accordance with claim 1 and including a bearing surface between said first interengaged thread set and said second interengaged thread set, wherein the radial wall thickness of said box member radially outward from said bearing surface is at least as stiff as the wall thickness of said pin member radially inward of said bearing surface.

6. A tubular connection in accordance with claim 1, wherein the successive threads of said pin thread set of said first interengaged thread set and said pin thread set of said second interengaged thread set progressing toward the end of the pin member has a respectively reduced diameter.

7. A tubular connection in accordance with claim 1, wherein the successive threads of said first thread set are of the same first circumferential dimension and the successive threads of said second thread set are of the same second circumferential dimension.

8. A tubular connection in accordance with claim 1 and including bearing surfaces on said pin and box members between said first interengaged thread set and said second interengaged thread set, wherein said bearing surfaces provide a fluid seal.

9. A tubular connection including a threaded pin member interengaging a threaded box member, said connection having circumferentially different first and second interengaged thread sets, comprising said first interengaged thread set including a circumferentially smaller pin thread set on the pin member, said first interengaged thread set having a fewer number of threads than the number of threads of said second interengaged thread set and a resultant smaller load flank area than the load flank area of said second interengaged thread set, the cross-sectional area of said pin member at the root of its largest circumferential thread plus said load flank areas matching the cross-sectional area of said box member at the root of its smallest circumferential thread plus said load flank areas.

10. A tubular connection in accordance with claim 9, wherein said cross-sectional areas and said load flank areas are matched by at least one of said thread sets including an appropriately dimensioned initial partial thread.

11. A tubular connection in accordance with claim 9, wherein said cross-sectional areas and said load flank areas are matched by at least one of said thread sets including some threads which are helically of constant diameter with respect to at least one of their root and crest dimensions conforming with other threads helically of constant diameter.

12. A tubular connection including a pin member and a box member, having a first interengaged thread set including a circumferentially small thread set on the forward end of the pin member and a corresponding circumferentially small thread set deepest within the box member, and a second interengaged thread set including a pin thread set and a box thread set axially displaced from said first interengaged thread set, said second interengaged thread set being circumferentially larger than said first interengaged thread set, comprising said pin member having a normal cross-sectional area $A_p$ at the last thread of said larger thread set that is larger than the normal cross-sectional area $A_b$ of the box member at the deepest first thread of said smaller thread set, and cross-sectional area $A_p$ being not greater than the sum of the area $AT_L$ of the load flank along the spiral length of the larger thread set and the normal cross-sectional area $A_{PS}$ of the pin member at the last thread of the smaller thread set, and said cross-sectional area $A_p$ being not greater than the sum of the area $AT_S$ of the load flank along the spiral length of the smaller thread set and the normal cross-sectional area $A_{bL}$ of the box member at the first thread of the larger thread set.

13. A tubular connection in accordance with claim 12, wherein area $A_{bL}$ is larger than area $A_{PS}$ and wherein area $AT_L$ is larger than area $AT_S$.

14. A tubular connection including a pin member and a box member, having a first interengaged thread set including a circumferentially smaller thread set on the forward end of the pin member and a correspondingly circumferentially small thread set deepest within the box member, and a second interenegaged thread set including a pin thread set and a box thread set axially displaced from said first interengaged thread set, said second interengaged thread set being circumferentially larger than said first interengaged thread set, comprising said box member having a normal cross-sectional area $A_b$ at the deepest first thread of said smaller thread set that is smaller than the normal cross-sectional area $A_p$ of the pin member at the last thread of said larger thread set, said cross-sectional area $A_b$ being not greater than the sum of the area $AT_S$ of the load flank along the spiral length of the smaller thread set and the normal cross-sectional area $A_{bL}$ of the box member at the first thread of the larger thread set.

15. The method of making a tubular connection including a pin member and a box member, having a first interengaged thread set including a circumferentially smaller thread set on the forward end of the pin member and a corresponding circumferentially small thread set deepest within the box member, and a second interengaged set including a pin thread set and a box thread set axially displaced from said first interengaged thread set, said second interengaged thread set being circumferentially larger than said first interengaged thread set, wherein the normal cross-sectional area $A_b$ of the box member at the deepest first thread of said smaller thread set is the critical dimension, which comprises determining the normal cross-sectional area $A_b$ of the box member at the deepest first thread of said smaller thread set, determining the normal cross-sectional area $A_p$ of the pin member at the last thread of said larger thread set is larger than the cross-sectional area $A_b$, determining that the sum of the area $AT_L$ of the load flank along the spiral length of the larger thread set and the normal cross-sectional area $A_{PS}$ of the pin member at the last thread of the smaller thread set is greater than said cross-sectional area $A_b$, and determining that the sum of the area $AT_S$ of the load flank along the spiral length of the smaller thread set and the normal cross-sectional area $A_{bL}$ of the box member at the first thread of the larger thread set is greater than the cross-sectional area $A_b$.

16. The method in accordance with claim 15, wherein area $A_{bL}$ is larger than area $A_{PS}$ and wherein area $AT_L$ is larger than area $AT_S$.

17. The method of making a tubular connection including a pin member and a box member, having a first interengaged thread set including a circumferentially small thread set on the forward end of the pin member and a corresponding circumferentially small thread set deepest within the box member, and a second interengaged thread set including a pin thread set and a box thread set axially displaced from said first interengaged thread set, said second interengaged thread set being circumferentially larger than said first interengaged thread set, wherein the normal cross-sectional area $A_p$ of the pin member at the last thread of said larger thread set is the critical dimension, which comprises determining the normal cross-sectional area $A_p$ of the pin member at the last thread of said larger thread set, determining that the normal cross-sectional area $A_b$ of the box member at the deepest first thread of said smaller thread set is larger than the cross-sectional area $A_p$, determining the the sum of the area $AT_L$ of the load flank along the spiral length of the larger thread set and the normal cross-sectional area $A_{ps}$ of the pin member at the last thread of the smaller thread set is gerater than said cross-sectional area $A_p$, and determining that the sum of the area $AT_s$ of the load flank along the spiral length of the smaller thread set and the normal cross-sectional area $A_{bL}$ of the box member at the first thread of the larger thread set is greater than the cross-sectional area $A_p$.

18. A tubular connection including a threaded pin member interengaging with a threaded box member, said connection having first and second interengaged thread sets of different sized diameters, comprising said first interengaged thread set including a circumferentially smaller pin thread set on the forward end of the pin member, said second interengaged thread set axially displaced therefrom including a circumferentially greater pin thread set on the pin member, a first torque shoulder at an angle to the axis of the connection between said first thread set and said second thread set for absorbing more than 50% of the assembly pre-load while the connection is being fully loaded, a second torque shoulder at an angle to the axis of the connection behind the last thread of the circumferentially greater thread set on the pin member for loading with respect to the entrance end of said box member, and a bearing surface behind the last thread of the circumferentially smaller thread set on said pin member for providing a metal-to-metal fluid seal, said first torque shoulder being at an acute angle with respect to the axis of the connection toward the forward end of said pin member.

19. A tubular connection in accordance with claim 18, wherein said acute angle is in the range of 60°–80°.

20. A tubular connection in accordance with claim 18, wherein there is no metal-to-metal fluid seal in the vicinity of said second torque shoulder.

21. A tubular connection in accordance with claim 20, wherein the angle to the axis of the connection of said second torque shoulder is the same as the acute angle that said first torque shoulder is with respect to the axis of the connnection.

22. A tubular connection in accordance with claim 21, wherein said acute angle that said first torque shoulder is with respect to the axis of the connection is approximately 80° and said angle to the axis of the connection of said second torque shoulder is approximately 80°.

23. A tapered tubular connection including a threaded pin member interengaging with a threaded box member, said connection having first and second interengaged thread sets of different sized diameters, comprising said first interengaged thread set including a circumferentially smaller pin thread set on the forward end of the pin member, said second interengaged thread set axially displaced therefrom including a circumferentially larger pin thread set on the pin member, at least one of said thread sets including at its forward pin end part at least two threads that are helically tapered in at least one of their root or crest dimension and at least two threads that are of constant diameter in at least one of their root or crest dimension so as to provide more usable thread contact for the same rotation when compared with helically uniformly matched thread sets.

24. A tapered tubular connection in accordance with claim 23, wherein said threads are of constant diameter are at the front of the thread set.

25. A tapered tubular connection in accordance with claim 24, wherein said threads that are of constant diameter include the initial partial thread.

26. A tubular connection including a threaded tapered pin member interengaging with a threaded tapered box member, said connection having first and second interengaged thread sets of different sized diameters, comprising said first interengaged thread set including a circumferentially smaller pin thread set on the forward end of the pin member, said second interengaged thread set axially displaced therefrom including a circumferentially greater pin thread set on the pin member, the pilot diameter root preceding the partial thread preceding the first full thread of said first thread set on said pin member being parallel with the axis of the connection, and the root between said partial thread and said first full thread of said first thread set on said pin member being parallel with the axis of the connection and equal in diameter with said pilot diameter, wherein the remaining roots of said first thread set on said pin member succeeding said first full thread are helically tapered.

27. A tubular connection including a threaded tapered pin member interengaging with a threaded tapered box member, said connection having first and second interengaged thread sets of different sized diameters, comprising said first interengaged thread set including a circumferentially smaller pin thread set on the forward end of the pin member, said second interengaged thread set axially displaced therefrom including a circumferentially greater pin thread set on the pin member, the pilot diameter root preceding the partial thread preceding the first full thread of said first thread set on said pin member being parallel with the axis of the connnection, and the root between said partial thread and said first full thread set on said pin member being parallel with the axis of the connection and equal in diameter with said pilot diameter, wherein the crest of said partial thread of said first interengaged thread set is parallel with the axis of the connection and is in increasing helical diameter continuity with the crest of said first full thread.

28. A tubular connection including a threaded tapered pin member interengaging with a threaded tapered box member, said connection having first and second interengaged thread sets of different sized diameters, comprising said first interenegaged thread set including a circumferentially smaller pin thread set on the forward end of the pin member, said second interengaged thread set axially displaced theefrom including a circumferentially greater pin thread set on the pin member, the pilot diameter root preceding the partial thread preceding the first full thread of said first thread set on said pin member being parallel with the axis of the connection, and the root between said partial thread and said first full thread of said first thread set on said pin member being parallel with the axis of the connection and equal in diameter with said pilot diameter, wherein the crest of at least one additional thread succeeding the first full thread of said first interengaged thread set is in increasing helical diameter therewith.

29. A tubular connection in accordance with claim 28, wherein the crests of the threads succeeding the last helically increasing-diameter thread are of constant diameter.

30. A tubular connection in accordance with claim 28, wherein at least two of the threads in the mid range of said first thread set have constant diameter roots and constant diameter crests.

31. A tubular connection in accordance with claim 30, wherein the remaining roots of said second thread set on said pin member succeeding said first full thread is helically tapered.

32. A tubular connection including a threaded tapered pin member interengaging with a threaded tapered box member, said connection having first and second interengaged thread sets of different sized diameters, comprising said first interengaged thread set including a circumferentially smaller pin thread set on the forward end of the pin member, said second interengaged thread set axially displaced therefrom including a circumferentially greater pin thread set on the pin member, the pilot diameter root preceding the partial thread preceding the first full thread of said first thread set on said pin member being parallel with the axis of the connection, the root between said partial thread and said first full thread of said first thread set on said pin member being parallel with the axis of the connection and equal in diameter with said pilot diameter, the pilot diameter root preceding the partial thread set preceding the first full thread of said second thread set on said pin member being parallel with the axis of the connection, the root between said second thread set partial thread and said second set first full thread on said pin member being parallel with the axis of the connection and equal in diameter with said second thread set pilot diameter, the crest of said partial thread of said first interengaged thread set being parallel with the axis of the connection and is in increasing helical diameter continuity with the crest of said first full thread and each succeeding thread thereafter of said first interengaged thread set, and the crest of said second set partial thread being parallel with the axis of the connection and is in increasing helical diameter continuity with the crest of said second interengaged thread set first full thread and each succeeding thread thereafter of said second interengaged thread set.

33. A tubular connection including a threaded tapered pin member interengaging with a threaded tapered box member, said connection having first and second interengaged thread sets of different sized diameters, comprising said first interengaged thread set including a circumferentially smaller pin thread set on the forward end of the pin member, said second interengaged thread set axially displaced therefrom including a circumferentially greater pin thread set on the pin member, the thread crest and root between the initial partial thread of said first thread set on said pin member prior to the next thread thereto being respectively of constant diameter, the thread crest and root of the first partial thread of the first thread set on said box member that corresponds with said initial partial thread of the first thread set on said pin member prior to the next thread thereto being respectively of constant diameter, and at least the majority of the remaining thread crests full thread and roots of said first thread set being helically tapered.

34. A tubular connection in accordance with claim 33, wherein the diameter of said root between the initial partial thread of said first thread set on said pin member is equal to the pilot root diameter forward of said initial partial thread.

35. A tubular connection in accordance with claim 33 wherein the thread crest and root between the initial partial thread of said second thread set on said pin member prior to the next thread thereto are respectively of constant diameter, and the thread crest and root of the first partial thread of the second thread set on said box member that corresponds with said initial partial thread of the second thread set on said pin member prior to the next thread thereto are respectively of constant diameter.

36. A tubular connection in accordance with claim 33, wherein the thread crest and root of the last full thread of said first thread set on said pin member are respectively of constant diameter, and the thread crest and root of the subsequent partial thread next to said last full thread of said first thread set on said pin member are respectively of constant diameter.

37. A tubular connection in accordance with claim 36 wherein the thread crest and root of the last full thread of said first thread set on said box member respectively of constant diameter, and the thread crest and root of the subsequent partial thread next to said last full thread of said first thread set on said box member are helically respectively of constant diameter.

38. A tubular connection in accordance with claim 36, wherein the thread crest and root of the last full thread of said second thread set on said pin member are respectively of constant diameter, and the thread crest and root of the subsequent partial thread next to said last full thread of said second thread set on said pin member are respectively of constant diameter.

39. A tubular connection in accordance with claim 38, wherein the thread crest and root of the last full thread of said second thread set and said box member are respectively of constant diameter, and the thread crest and root of the subsequent partial thread next to said last full thread of said second thread set on said box member are respectively of constant diameter.

40. A tubular connection including a threaded tapered pin member interengaging with a threaded tapered box member, said connection having first and second interengaged thread sets of different sized diameters, comprising said first interengaged thread set including a circumferentially smaller pin thread set on the forward end of the pin member, said second interengaged thread set axially axially displaced therefrom including a circumferentially greater pin thread set on the pin member, the angle of taper of said pin member with respect to the axis of the connection being greater than the angle of taper of asid box member in said first thread set, and the angle of taper of said pin member with respect to the axis of the connection being smaller than the angle of taper of said box member in said second thread set, said threads in said interengaged thread sets having hooked load flanks, the combining effect of thread taper mismatch and thread hooked load flanks creating a varied thread engagement from thread to thread in each of said thread sets so as to create a more uniform distribution of thread load than with the threads of thread sets having the same angle of taper on both pin member and box member.

41. A tubular connection in accordance with claim 40, wherein said respective angles of taper are with respect to the helical progression of the threads of said thread sets, the roots and crests of said thread sets being parallel to the axis of the connection.

42. A tubular connection in accordance with claim 41, wherein the flanks of the threads of said thread sets are negatively angled relative to planes normal to the axis of the connection.

43. A tubular connection in accordance with claim 40, wherein a normal tension load substantially evenly distributes the load of the connection among the load flanks of the threads.

44. A tubular connection in accordance with claim 43, wherein clearances are maintained between respective thread crests and roots under normal tension load.

45. A tubular connection including a threaded pin member interengaging with a threaded box member, said connection having first and second interengaged thread sets of different sized diameters, comprising said first interengaged thread set including a circumferentially smaller pin thread set on the forward end of the pin member, said second interengaged thread set axially displaced therefrom including a circumferentially greater pin thread set on the pin member, a first torque shoulder at an angle to the axis of the connection between said first thread set and said second thread set for absorbing more than 50% of the load while the connection is being assembly pre-loaded, a second torque shoulder at an angle to the axis of the connection behind the last thread of the circumferentially greater thread set on the pin member for loading with respect to the entrance end of said box member, a first bearing surface in front of the first thread of the circumferentially smaller thread set on said pin member for providing a first metal-to-metal fluid seal, and a second bearing surface behind the last thread of the circumferentially smaller thread set on said pin member for providing a second metal-to-metal fluid seal.

46. A tubular connection in accordance with claim 45, wherein fluid leakage passage is provided in the vicinity of said second torque shoulder.

47. A tubular connection in accordance with claim 46, wherein asid first torque shoulder is at an acute angle with respect to the axis of the connection toward the forward end of said pin member.

48. A tubular connection in accordance with claim 47, wherein said second torque shoulder is at an acute angle with respect to the axis of the connection toward the forward end of said pin member.

49. A tubular connection in accordance with claim 47, wherein said first torque shoulder acute angle is approximately 85°.

50. A tubular connection in accordance with claim 49, wherein said second torque shoulder acute angle is approximately 85°.

51. A tubular connection including a pin member and a box member, comprising a first interengaged thread set including a circumferentially smaller thread set on the forward end of the pin member, a second interengaged thread set axially displaced therefrom including a circumferentially greater thread set on the pin member, the flanks of the threads of each of said thread sets being negatively angled relative to planes normal to the axis of the connection, a torque shoulder at a right or oblique angle to the axis of the connection between said first thread set and said second thread set, and a metal-to-metal fluid seal only at the root of said torque shoulder.

* * * * *